(12) United States Patent
Lauschke et al.

(10) Patent No.: US 11,479,272 B2
(45) Date of Patent: Oct. 25, 2022

(54) GANGWAY FOR CONNECTING A FIRST CAR OF A MULTI-CAR VEHICLE TO A SECOND CAR

(71) Applicant: DELLNER COUPLERS AB, Falun (SE)

(72) Inventors: Uwe Lauschke, Magdeburg (DE); Jason Fowler, Derby (GB); Samuel Oldroyd, Leicestershire (GB); Daniel Alton, Staffordshire (GB); Christopher Meers, Derby (GB)

(73) Assignee: Dellner Couplers AB, Falun (SE)

( * ) Notice: Subject to any disclaimer, the term of this patent is extended or adjusted under 35 U.S.C. 154(b) by 158 days.

(21) Appl. No.: 16/983,390

(22) Filed: Aug. 3, 2020

(65) Prior Publication Data

US 2021/0031813 A1 Feb. 4, 2021

(30) Foreign Application Priority Data

Aug. 2, 2019 (EP) .................................... 19 189 898
Dec. 2, 2019 (EP) .................................... 19 212 918

(51) Int. Cl.
  *B61D 17/22* (2006.01)
  *B61D 1/00* (2006.01)
(52) U.S. Cl.
  CPC ............... *B61D 17/22* (2013.01); *B61D 1/00* (2013.01)
(58) Field of Classification Search
  CPC .......... B61D 17/22; B61D 1/00; B61D 17/10; B61D 17/20; B61D 3/187; B60D 5/003; B60D 5/006; B62D 47/025
  See application file for complete search history.

(56) References Cited

U.S. PATENT DOCUMENTS

| 6,401,626 B1 * | 6/2002 | Goebels ................ B61D 17/20 105/8.1 |
| 7,322,298 B2 | 1/2008 | Petit et al. |
| 2005/0183622 A1 * | 8/2005 | Petit ...................... B60D 5/006 105/8.1 |

FOREIGN PATENT DOCUMENTS

| AT | 13451 U1 | * 10/2013 | |
| CN | 103625488 B | * 2/2017 | ............. B61D 17/20 |
| DE | 102011110873 A1 | * 2/2013 | ............. B60D 5/003 |
| DE | 202014003031 U1 | * 6/2014 | ............. B60D 5/003 |
| DE | 202015002559 U1 | * 8/2015 | ............. B60D 5/003 |
| EP | 0 616 937 A1 | 9/1994 | |
| EP | 1 568 520 A1 | 8/2005 | |

(Continued)

*Primary Examiner* — Mark T Le
(74) *Attorney, Agent, or Firm* — Howard IP Law Group, PC

(57) ABSTRACT

A gangway for connecting a first car of a multi-car vehicle to a second car, comprising a first vehicle mounting plate at a first end for mounting the gangway to the first car, a second vehicle mounting plate at a second end for mounting the gangway to the second car or to a frame arranged at the second end for mounting the gangway to a second gangway, a first frame arranged between the first vehicle mounting plate and second vehicle mounting plate, or between the first vehicle mounting plate and a frame arranged at the second end for mounting to a second gangway, a second frame between the first vehicle mounting plate and first frame, wherein a bellows is attached to at least one of the first and second frames, first vehicle mounting plate and second vehicle mounting plate or the frame arranged at the second end.

10 Claims, 9 Drawing Sheets

(56) References Cited

FOREIGN PATENT DOCUMENTS

| EP | 2322364 A1 | * | 5/2011 | ............. B60D 5/003 |
| EP | 2607114 A1 | * | 6/2013 | ............. B60D 5/003 |
| EP | 2 998 135 A1 | | 3/2016 | |
| EP | 3 266 629 A1 | | 1/2018 | |
| EP | 3495227 A1 | * | 6/2019 | ............... B60D 5/00 |

* cited by examiner

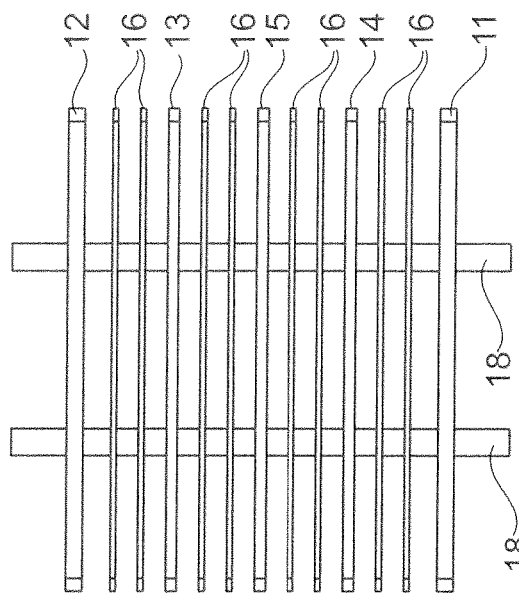
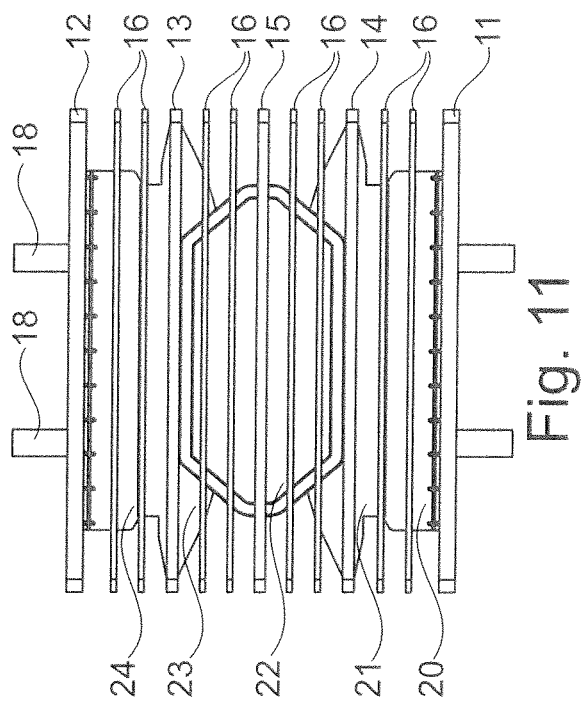
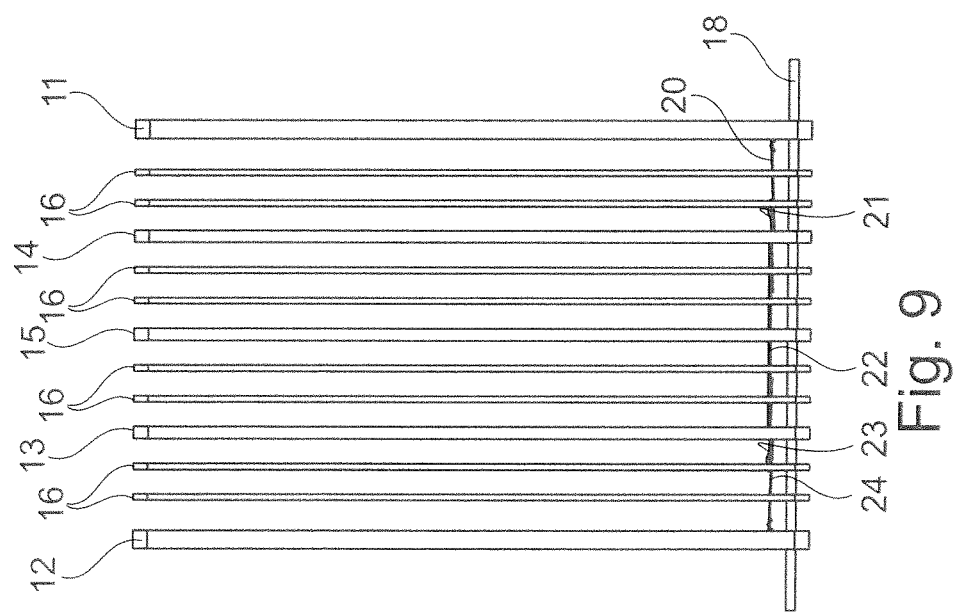

GANGWAY FOR CONNECTING A FIRST CAR OF A MULTI-CAR VEHICLE TO A SECOND CAR

FIELD OF INVENTION

The invention relates to a gangway for connecting a first car of a multi-car vehicle to a second car. The invention also relates to a multi-car vehicle with a first car and a second car.

BACKGROUND

From WO 2016/041638 A1 a gangway for connecting a first car with a second car and allowing passage of passengers from the first car to the second car is known. The gangway has a first vehicle mounting plate (called "first hoop for attaching the gangway to the first car" in WO 2016/041638 A1). The gangway also has a second vehicle mounting plate (called "second hoop for attaching the gangway to the second car"). The gangway is further described to have a frame (called "third hoop") arranged between the first vehicle mounting plate and the second vehicle mounting plate. The gangway is also described to have a further frame (called "fourth hoop" in WO 2016/041638 A1) arranged between the first vehicle mounting plate and the second vehicle mounting plate. WO 2016/041638 A1 teaches a connection element to be arranged between the one frame (called "third hoop" in WO 2016/041638 A1) and the other frame (called "fourth hoop" in WO 2016/041638 A1) and for this connection element to elastically connect the one frame (the "third hoop") to the other frame (the "fourth hoop").

For gangways for connecting a first car with a second car of a multi-car vehicle, it is desirable that the gangways are designed to return to a normal position, if the first car and the second car come into a geometric relation to one another that is a representation of the normal position. Typically, the normal position is the position, when the first car and the second car are arranged in a straight line one behind the other and on a level plane.

SUMMARY

Given this background, the problem to be solved by the invention is to improve the behavior of a gangway in situations where the first car of the multi-car vehicle changes its relative position relative to the second car of the multi-car vehicle, e.g. in situations, where the multi-car vehicle after having travelled around a bend returns to a straight line position.

This problem is solved by the gangway and the multi-car vehicle according to the present claims. Preferred embodiments are given in the subordinate claims and the description that follows hereafter.

The gangway according to the invention is suitable for connecting a first car of a multi-car vehicle to a second car of the multi-car vehicle.

Multi-car vehicles are known in different designs and in different forms of adaptation for uses. Multi-car vehicles, for example, railway-bound trains (street cars and subway-trains also being considered as such trains) are known and are known for the purpose of transporting passengers as well as transporting goods. Further types of multi-car vehicles can be magnetic railway trains or can be buses (road buses as well as buses travelling on fixed tracks). A car of a multi-car vehicle can be a self-supporting car, whereby the car has sufficient wheels that are placed at sufficient locations such that the car can stand by itself without being supported by other cars, for example a three-wheeled car, a four wheeled car or a car with even more wheels placed suitable locations. A car of a multi-car vehicle can also be of the non-self-supporting type, whereby the car has no wheels or only wheels provided in such number or arranged at such a place that the car cannot stand by itself, but is vertically supported by at least one neighbouring car.

The present invention pertains to a gangway that can in a preferred embodiment be used with such types of multi-car vehicles and is suitable to connect a first car with a second car and to allow passage of passengers from the first car to the second car. In the majority of embodiments, the cars of the multi-car vehicle will be connected by a separate connecting device, for example a coupler, that connects the cars in a manner allowing the transmittal of substantial pulling and pushing forces. In the majority of cases, the gangway is designed separately and predominantly designed with the requirements for the passage of passengers from the first car to the second car in mind.

Such gangways are known to be designed of different individual elements.

Some gangways are designed to have a first vehicle mounting plate at a first end for mounting the gangway to the first car and/or to have a second vehicle mounting plate at a second end for mounting the gangway to the second car.

A vehicle mounting plate is understood to be the interface of the gangway that is arranged at the end of the gangway to connect the gangway to the car. Typical designs are, that the car has a specific end design, e.g. an end frame, and that the gangway has a vehicle mounting plate. The vehicle mounting plate is mounted against the end frame of the car. Such designs facilitate the division of labor. Such designs allow the car of the multi-car vehicle to be manufactured at one manufacturing site and the gangway to be manufactured at a different manufacturing site, the vehicle mounting plate allowing for easy attachment of the gangway to the car in an assembly plant. Additionally, the use of a vehicle mounting plate allows the multi-car vehicle to be at least partially disassembled. If one car of a multi-car vehicle is to be decoupled from the multi-car vehicle, e.g. if the multi-car vehicle is to be shortened, the use of a vehicle mounting plate facilitates the detachment of one car from the multi-car vehicle. The vehicle mounting plate allows for designs that can allow for easy attachment and easy detachment of the vehicle mounting plate (and thus the gangway) to a car.

A gangway according to the invention can have a first vehicle mounting plate at a first end for mounting the gangway to the first car and can have a second vehicle mounting plate a second end for mounting the gangway to the second car. Such designs are often used when the gangway takes up the complete room between the first car and the second car.

A gangway according to the invention can also have a first vehicle mounting plate at a first end for mounting the gangway to the first car, but no second vehicle mounting plate at a second end that could be used for mounting the gangway to the second car. In such a design, the gangway has a first vehicle mounting plate and a frame, whereby the frame is arranged at the second end of the gangway. Such a design could be used to attach this gangway to a second gangway, whereby the second gangway could in a preferred embodiment have a (second) vehicle mounting plate at one end and would also have a frame at its other end, which frame could be used to attach the second gangway to the frame of the first gangway. Such designs are, e.g. used to allow a splitting of the gangways, whereby the respective gangway remains attached to its respective car.

The gangway according to the invention has a frame. In a gangway that has a first vehicle mounting plate and a second vehicle mounting plate, such a first frame and a second frame are arranged between the first vehicle mounting plate and the second vehicle mounting plate. The first frame is arranged between the first vehicle mounting plate and the second vehicle mounting plate or arranged between the first vehicle mounting plate and a frame arranged at the second end for mounting the gangway to a second gangway. The second frame arranged between the first vehicle mounting plate and the first frame. A frame arranged at an end of a gangway sometimes is also referred to as "face plate", and will be referred to as "face plate" below.

The gangway also has at least one hoop. The hoop is arranged between the first vehicle mounting plate and the second frame or arranged between the second frame and the first frame or the first frame and the second vehicle mounting plate or arranged between the first frame and a face plate.

For the description of this invention, a "frame" is considered as an object that is suitable to be attached to a supporting piece or to rest on a supporting piece. A frame hence has sufficient strength to take up a portion of the weight of the gangway and to transfer this portion of the weight into the supporting piece. The supporting piece could, e.g., be an arm, whereby the frame is attached to the arm. The support piece could also be a beam, whereby the frame rests on the beam. The support piece could also be the coupler of a train, whereby the frame rests on the coupler of the train/is supported by the coupler of the train.

Such a (first or second) vehicle mounting plate or frame can be of u-shape or c-shape or can have the shape of a ring that surrounds a passage space. The passage space is the window in the frame, through which the passengers can enter into the gangway/pass through the gangway. The term "ring" is not limited to circular rings or elliptically shaped rings. The term "ring" simply identifies that the frame closes around the passage space. The ring can, for example, also have a rectangular shape. The ring can also have a trapezoidal shape or any polygonal shape. In some designs, the ring can have a top beam and a bottom beam that are straight and have two side beams that connect the respective ends of the top beam and the bottom beam, whereby the side beams can have a curvature. The shape of the (first or second) vehicle mounting plate or frame often is chosen either in dependency of the overall shape of the object, to which it is attached. Hence the (first or second) vehicle mounting plate or frame often is designed in dependency of the cross-sectional shape of a car of a multi-car train or a further gangway, to which it might be connected. The shape of the (first or second) vehicle mounting plate or frame can also be chosen in relation to the interface that the neighbouring object, to which the (first or second) vehicle mounting plate or frame is to be connected, offers.

The (first or second) vehicle mounting plate or frame comprises a beam. The (first or second) vehicle mounting plate or frame can be made up of several beams that are connected to each other. For example, if the (first or second) vehicle mounting plate or frame is chosen to be u-shaped, the (first or second) vehicle mounting plate or frame can have a straight top beam with a first end and a second end, whereby a side frame is connected to the first end and a further side frame is connected to the second end of the top beam, the two side beams extending at an angle, preferably at an angle of about or exactly 90° to the top beam. In an embodiment, wherein the (first or second) vehicle mounting plate or frame is designed to be a ring, the (first or second) vehicle mounting plate or frame can have a top beam, two side beams and a bottom beam. Additional beams can be provided, for example between one end of a top beam and one end of a side beam, for example by way of a diagonal beam that connects one end of a top beam with the top end of a side beam. A u- or c-shaped (first or second) vehicle mounting plate or frame or even a ring-shaped (first or second) vehicle mounting plate or frame can be made up of one singular beam. Using extrusion methods or moulding methods, it is possible to provide such end beams that are made of one singular beam that is moulded or extruded into the desired u-, c- or even ring-shape (whereby when producing a ring-shape it might become necessary to interconnect two free ends of an extruded profile for example by welding or gluing in order to complete the ring).

In a preferred embodiment, the beam is a longitudinal beam. In a preferred embodiment, the extent of the beam in a first direction of a three-dimensional system of coordinates, especially preferred a cartesian system of coordinates, is substantially larger than the extent of the beam in the second direction and is substantially larger than the extent of the beam in the third direction. In a preferred embodiment, the cross-section of the beam in a section perpendicular to the direction of its longest extent is generally rectangular or generally quadratic, but could also be generally circular or generally of elliptical shape.

In a preferred embodiment, the cross-sectional shape of the beam in the cross-sections perpendicular to its direction of longest extent stay the same for the majority of the extent of the beam. Most preferably, 60%, most preferably 70%, most preferably 80%, most preferably 90% of the extent of the beam in the direction of its longest extent has the same cross-section. The cross-section might vary towards the respective end of the beam to facilitate the connection of the respective beam to a neighbouring beam. In an especially preferred embodiment, the beam has the same cross-sectional shape along its full extent in its direction of longest extent. This might, for example, be the case, if the beam is an extruded beam.

In a preferred embodiment, where the (first or second) vehicle mounting plate or frame has several beams that are connected to each other, for example screwed together at flanges or welded together or glued together, the individual beams at least for the majority of their extent into their respective direction of longest extent have the same cross-sectional shape.

In a preferred embodiment, where the (first or second) vehicle mounting plate or frame is made up of several beams, the majority of the beams, more preferably all beams have the same cross-sectional design or for those embodiments, where the individual beams only have a constant cross-sectional design for a certain percentage of their individual longitudinal extend, that shape of the cross section, that for a certain percentage of the individual longitudinal extend of the individual beam is constant, is the same shape for the majority of beams, preferably all beams that only have a constant cross-sectional design for a certain percentage of their individual longitudinal extend.

In a preferred embodiment, the beam is a profiled beam. In a preferred embodiment, the profiled beam has a section that in cross-section is c- or u-shaped, whereby the opening of the groove opens towards the interior of the section that in cross-section is c- or u-shaped.

In a preferred embodiment of the embodiment, where the (first or second) vehicle mounting plate or frame is made up of several beams, the majority of beams, more preferably all beams are cut off sections from a profiled beam that was cut into sections to provide the majority, preferably all individual beams that make up the (first or second) vehicle mounting plate or frame.

In contrast to a frame, a hoop is understood to be a lightweight piece that gives the gangway, especially the bellows of the gangway, especially the convolutes of the bellows of the gangway some structure. A hoop can, e.g., be an elongated crimping piece that crimps together two ends of neighboring convolutes of a bellows. According to the invention, the bellows, more preferably a convolute of the bellows is attached to the hoop. In a preferred embodiment, the hoop connects one end of a first convolute of the bellows to on end of a second convolute of the bellows.

A "hoop" can also be distinguished from the first frame, the second frame, the first vehicle mounting plate and the second vehicle mounting plate or the face plate in that the first frame, the second frame, the first vehicle mounting plate and the second vehicle mounting plate or the face plate are configured to support floor plates of the gangway, while the hoop does not support a floor plate. Most preferably, in the normal position of the gangway, any hoop of the gangway is distanced from any floor plate of the gangway.

The gangway according to the invention has floor plates. Floor plates are provided in gangways for passengers to step on as they pass through the passage space. According to the invention, the first frame, the second frame, the first vehicle mounting plate and the second vehicle mounting plate or the face plate are configured to support floor plates of the gangway. "Supporting" a floor plate means that the floor plate at least in the normal position of the gangway rests on the respective object/is supported by the respective object from below.

In a preferred embodiment several floor plates are provided, whereby each floor plate is supported by at least one of the first frame, the second frame, the first vehicle mounting plate and the second vehicle mounting plate or the frame arranged at the second end for mounting the gangway to a second gangway. In a preferred embodiment a first floor plate is supported by the first vehicle mounting plate, a second floor plate is supported by the second frame, a third floor plate is supported by the first frame and a fourth floor plate is supported by the second vehicle mounting plate or the face plate.

In a preferred embodiment, a floor plate rests on two elements of the group of elements that contains the first frame, the second frame, the first vehicle mounting plate and the second vehicle mounting plate or the frame arranged at the second end for mounting the gangway to a second gangway. In a preferred embodiment, a floor plate is supported by the first vehicle mounting plate and the second frame, and/or a floor plate is supported by the first frame and the second frame and/or a floor plate is supported by the first frame and the second vehicle mounting plate or the frame arranged at the second end for mounting the gangway to a second.

Embodiments are feasible, where the floor plates overlap each other. In such a case, the respective floor plate that is on the top and is supported by a floor plate below it, would still be "supported" by one of the elements of the group of the first frame, the second frame, the first vehicle mounting plate and the second vehicle mounting plate or the face plate, because the floor plate that supports the floor plate resting on it is itself supported by an element of the group of the first frame, the second frame, the first vehicle mounting plate and the second vehicle mounting plate or the face plate.

In a preferred embodiment, a floor plate is fixedly attached to one element of the group of elements of the first frame, the second frame, the first vehicle mounting plate and the second vehicle mounting plate or the face plate and supported by a different element of the group of elements of the first frame, the second frame, the first vehicle mounting plate and the second vehicle mounting plate or the face plate.

In a preferred embodiment, one floor plate is fixedly attached to the first vehicle mounting plate and supported by the second frame. In an alternative embodiment, one floor plate is supported by the first vehicle mounting plate and fixedly attached to the second frame.

In a preferred embodiment, one floor plate is fixedly attached to the first frame and supported by the second frame. In an alternative embodiment, one floor plate is supported by the first frame and fixedly attached to the second frame.

In a preferred embodiment, one floor plate is fixedly attached to the second vehicle mounting plate or the face plate and supported by the first frame. In an alternative embodiment, one floor plate is supported by the second vehicle mounting plate or the face plate and fixedly attached to the first frame.

In a preferred embodiment, a floor plate that is fixedly attached to an element of the group of the first frame, the second frame, the first vehicle mounting plate and the second vehicle mounting plate or the face plate is allowed to swivel relative to this element, preferably to swivel about a horizontal axis. A floor plate can be fixedly attached to an element of the group by a mechanical swivel or can be mounted on rubber buffers to allow some movement.

The gangway has at least one bellows. The gangway might have an outwardly facing bellows. An outwardly facing bellows is understood to be a bellows, whereby the individual convolutes of the bellows open towards the inside of the gangway while the rounded or v-shaped bottoms of the individual convolutes are arranged further outward. The gangway might have an inwardly facing bellows. An inwardly facing bellows is understood to be a bellows, whereby the individual convolutes of the bellows open towards the outside of the gangway while the rounded or v-shaped bottoms of the individual convolutes are arranged further inward. The gangway might even have outwardly facing bellows and inwardly facing bellows. The inwardly facing bellows might be arranged to the inside of the outwardly facing bellows such that the bottoms of the individual convolutes of the inwardly facing bellows form the elements that delimit the passage space, while the bottoms of the individual convolutes of the outwardly facing bellows form part of the outside perimeter of the gangway. The inwardly facing bellows might also be arranged to the outside of the outwardly facing bellows such that the bottoms of the individual convolutes of the outwardly facing bellows and the bottoms of the individual convolutes of the inwardly facing bellows face each other in a middle section of the gangway, while the individual convolutes of the inwardly facing bellows open towards the outside of the gangway and the individual convolutes of the inwardly facing bellows open towards the inside of the gangway. The gangway might also have two inwardly facing bellows, the one being arranged inside the other. The gangway might have two outwardly facing bellows, the one being arranged inside the other. The gangway might have no bellows or might have in addition to bellows sliding walls that slide relative to each other in a telescopic manner. One end of the bellows might be attached to the first vehicle mounting plate. The attachment of the end of the bellows to the first vehicle mounting plate can be made by bolts, stitching, clamping or possibly even a Velcro arrangement or even gluing or welding. Likewise, the attachment of a convolute of the bellows to a hoop or to a frame can be made by bolts, stitching, clamping or possibly even a Velcro arrangement or even gluing or welding.

The gangway according to the invention has a normal position in which normal position the elements of the group the first frame, the second frame, the first vehicle mounting plate and the second vehicle mounting plate or the face plate have a predefined position relative to each other. Gangways are typically designed with a normal position in mind. In the majority of the cases, the normal position will be that position that the elements of the gangway take up, if the first car of the multi-car vehicle and the second car of the multi-car vehicle are arranged in a straight line and on a level plane. Preferably, the normal position is that position where at least some, preferably at least the majority, preferably all elements of the above defined group of elements are arranged in parallel to each other.

In a preferred embodiment, a series of elements is arranged between the first vehicle mounting plate and the second vehicle mounting plate, whereby each element of the series is either a frame or a hoop. In a preferred embodiment, a series of elements is arranged between the first vehicle mounting plate and the frame arranged at the second end of the gangway, whereby each element of the series is either a frame or a hoop. In a preferred embodiment, the number of hoops in the series is higher than the number of frames in the series.

In a preferred embodiment a first hoop is arranged between the first vehicle mounting plate and the second frame and a second hoop is arranged between the first frame and the second frame and a third hoop is arranged between the first frame and the second vehicle mounting plate or the face plate.

In a preferred embodiment more than one hoop is arranged between the first vehicle mounting plate and the second frame and/or more than one hoop is arranged between the first frame and the second frame and/or more than one hoop is arranged between the first frame and the second vehicle mounting plate or the face plate.

In a preferred embodiment two or more hoops arranged between the first vehicle mounting plate and the second frame and/or two or more hoops are arranged between the first frame and the second frame and/or two or more hoops are arranged between the first frame and the second vehicle mounting plate or the face plate. In a preferred embodiment, the number of hoops arranged between a first frame and a second frame is taken from the range of 1 to 10, preferably 1 to 7, more preferably 1 to 5 and even more preferred 1 to 3.

In a preferred embodiment, the same number of hoops is provided between
the first vehicle mounting plate and the second frame,
the first frame and the second frame,
the first frame and the second vehicle mounting plate or the face plate.

In a preferred embodiment a further frame is arranged between the first frame and the second frame. In an even more preferred embodiment more than one frame is arranged between the first frame and the second frame. In an even more preferred embodiment more than two frames are arranged between the first frame and the second frame. In a preferred embodiment, the same number of hoops is provided between each two frames of the gangway.

In a preferred embodiment, a support structure is provided, whereby the support structure is connected to the first vehicle mounting plate and/or the support structure is connected to the second vehicle mounting plate and/or the support structure is connected to the frame and/or the frame rests on the support structure. The support structure can be an arm or a beam. The support structure can also be a coupler that connects the first car of a multi-car vehicle to a second car of a multi-car vehicle.

In a preferred embodiment, at least the first frame and the second frame are supported on the support structure. In a preferred embodiment, all frames of the gangway are supported on the support structure.

In a preferred embodiment the hoop is not supported by the support structure. In a preferred embodiment the hoop is arranged distanced from the support structure. In a preferred embodiment all hoops of the gangway are arranged distanced from the support structure.

The multi-car vehicle according to the invention has a first car and a second car and has a gangway according to the invention, whereby the first vehicle mounting plate is connected to the first car and the second vehicle mounting plate is connected to the second car.

In an alternative, the multi-car vehicle according to the invention has a first car and a second car and has a first gangway according to the invention, with a first vehicle mounting plate that is connected to the first car and has a second gangway according to the invention, with a second vehicle mounting plate that is connected to the second car, whereby the first gangway has a frame (a face plate) at the second end of the first gangway that is attached to a frame (a face plate) that is provided a the other end of the second gangway (that end of the second gangway that is opposite to the end on which the second vehicle mounting plate is arranged).

In a preferred embodiment, the multi-car the first car is coupled to the second car by a coupling. In a preferred embodiment, the first frame and/or the second frame are supported on the coupling. In a preferred embodiment, the hoop is not supported on the coupling.

BRIEF DESCRIPTION OF DRAWINGS

The invention will be described by way of figures that only show possible embodiments of the invention.

FIG. 9 a schematic sectional side view onto a first embodiment of a gangway according to the invention;

FIG. 10 a schematic top view onto the gangway according to FIG. 9;

FIG. 11 a schematic top view onto the gangway according to FIG. 9;

DETAILED DESCRIPTION

Figure 1:
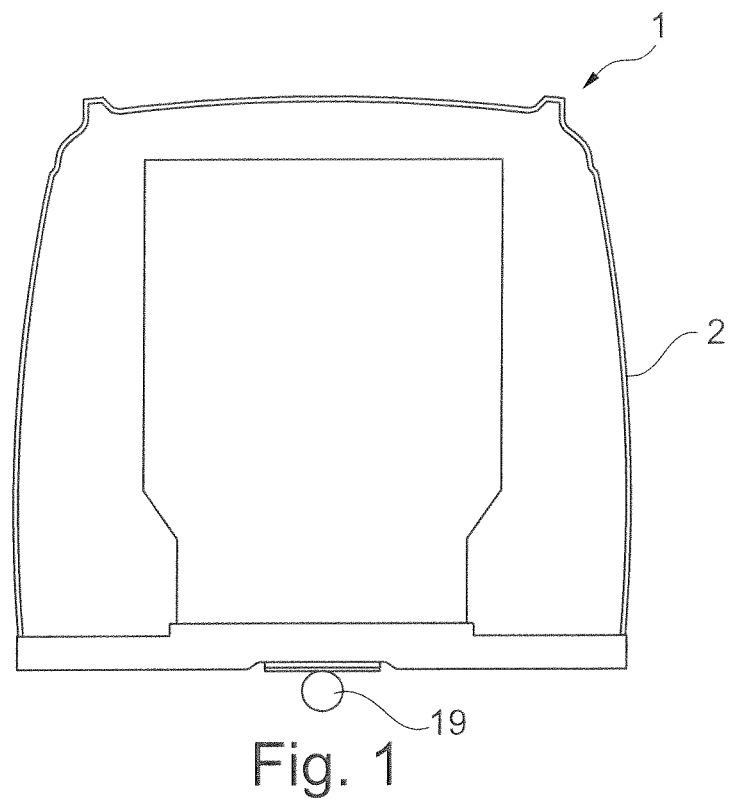
FIG. 1 shows a schematic sectional view from inside a car of a first embodiment of a multi-car vehicle onto the end of the car and a gangway that is arranged between the car and a second car of the multi-car vehicle.
Figure 2:
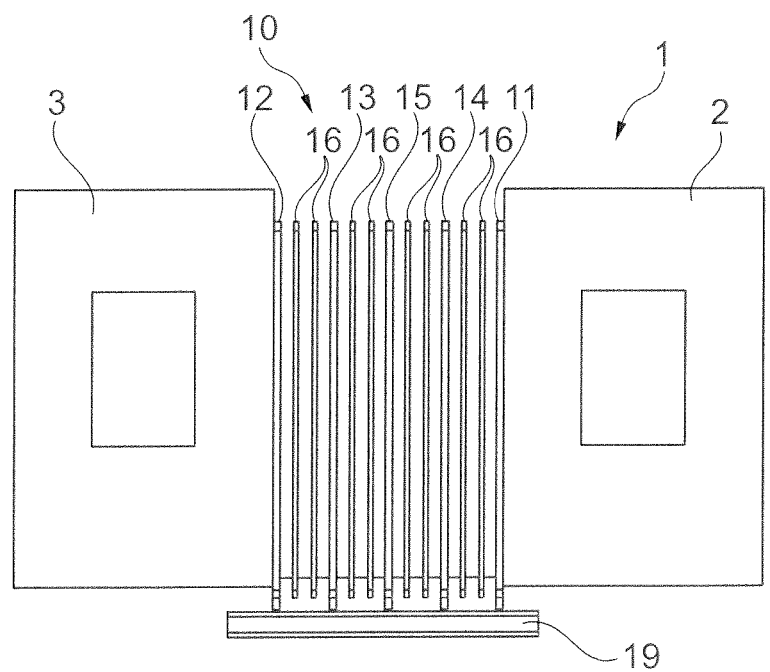
FIG. 2 shows a sectional side view along the line J-J in FIG. 1.
Figure 3:
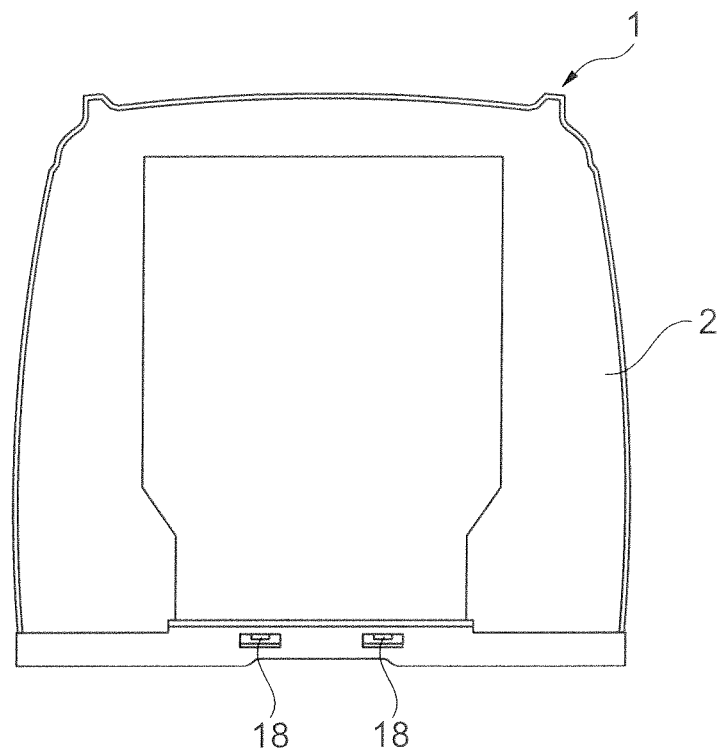
FIG. 3 shows a sectional view from inside a car of a first embodiment of a multi-car vehicle onto the end of the car and a gangway that is arranged between the car and a second car of the multi-car vehicle.
Figure 4:
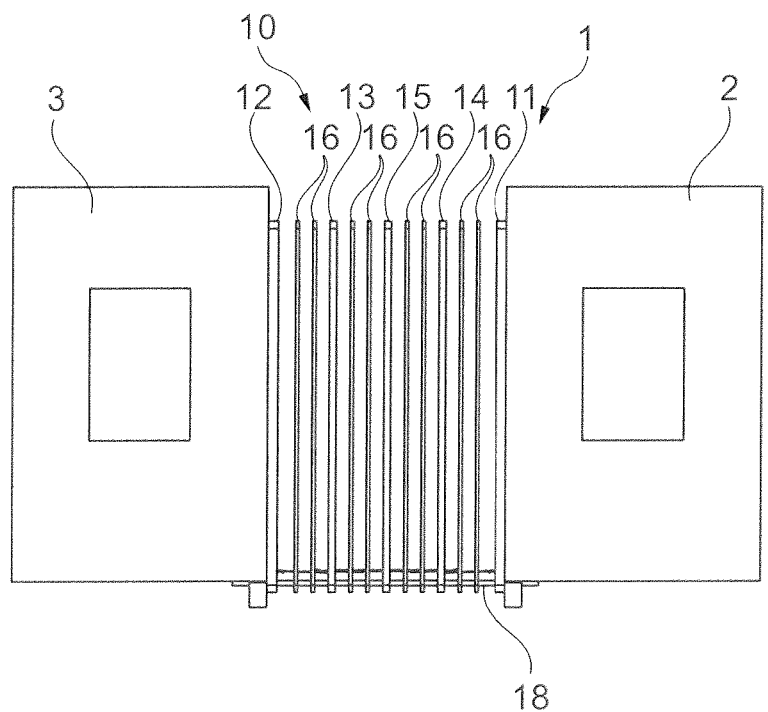
FIG. 4 shows a sectional side view along the line K-K in FIG. 3.

FIGS. 1, 2, 3, 4 and 15 show a multi-car vehicle 1 with a first car 2 and a second car 3. A gangway 10 that connects the first car 2 with the second car 3 is arranged between the first car 2 and the second car 3. FIGS. 1, 2, 4 and 4 are drawn without showing the convolutes of the bellows 17 in order to better show the arrangement of the first vehicle mounting plate 11, the second vehicle mounting plate 12, the first frame 13, the second frame 14, the further frame 15 and the hoops 16.

In the embodiment shown in FIG. 1, 2, the gangway 10 is supported by the coupler 19. In the embodiment shown in FIG. 3, 4, the gangway 10 is supported by two support beams 18.

Figure 5:
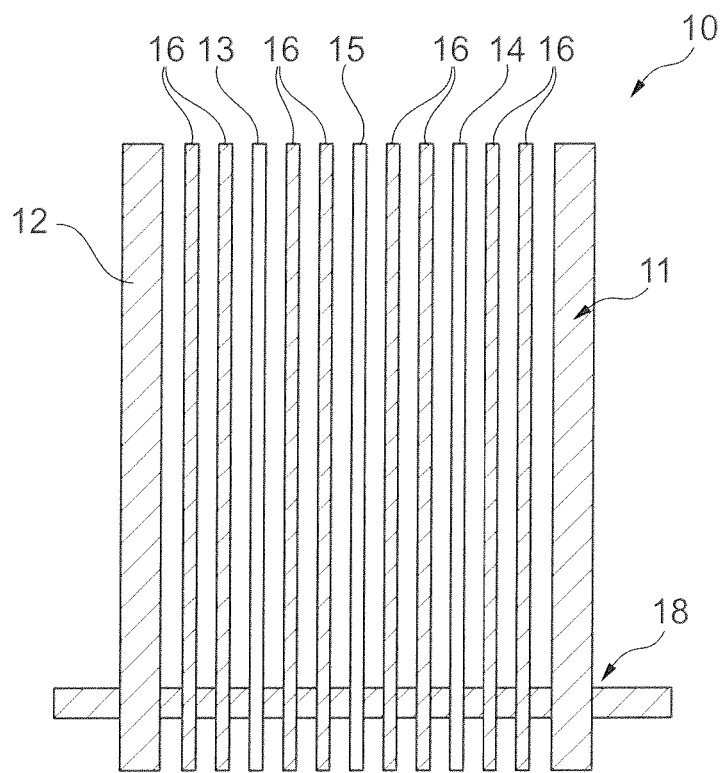
FIG. 5 a schematic side view onto a first embodiment of a gangway according to the invention.
Figure 6:
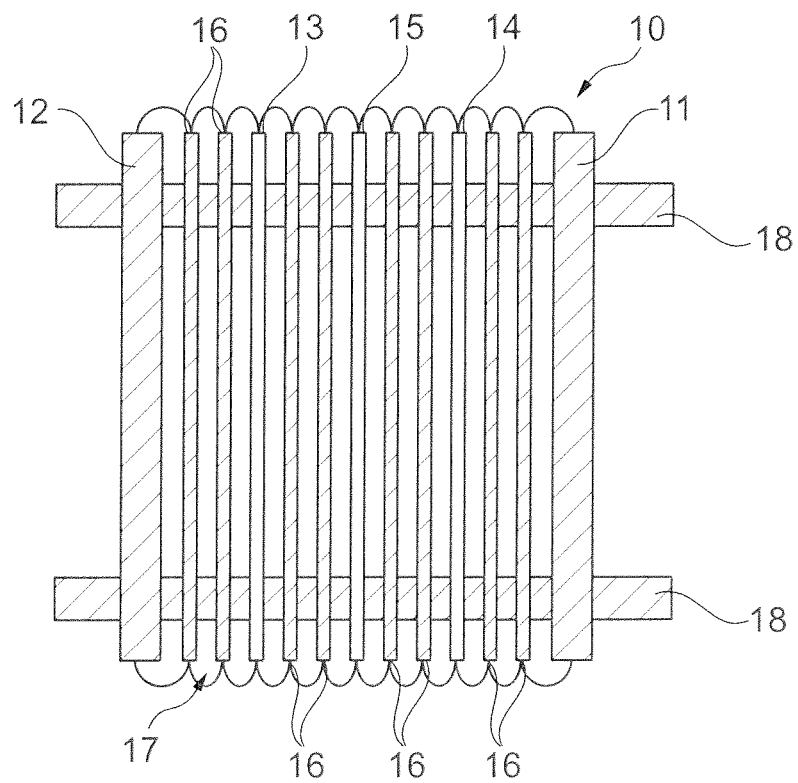
FIG. 6 a schematic top view onto the gangway according to FIG. 5.

FIGS. 5 and 9 show a schematic side view onto a gangway 10 according to the invention. The gangway 10 has a first vehicle mounting plate 11 at a first end for mounting the gangway 10 to the first car and a second vehicle mounting plate 12 at a second end for mounting the gangway 10 to the second car. The gangway also has a first frame 13 arranged between the first vehicle mounting plate 11 and the second vehicle mounting plate 12. The gangway also has a second frame 14 arranged between the first vehicle mounting plate 11 and the first frame 13. The gangway also has a further frame 15 arranged between the first frame 13 and the second frame 14.

A first floor plate 20 is supported by the first vehicle mounting plate 11 and the second frame 14. A second floor plate 21 is supported by the second frame 14 and the first vehicle mounting plate 11 by way of the second floor plate 21 resting on the first floor plate 20. A third floor plate 22 is supported by the further frame 15 and the first frame 13 (by way of resting on a fourth floor plate 23) and the second frame 14 (by way of resting on the second floor plate 21). The fourth floor plate 23 is supported by the first frame 13 and the second vehicle mounting plate 12 by way of the fourth floor plate 23 resting on a fifth floor plate 24. A fifth floor plate 24 is supported by the second vehicle mounting plate 12 and the first frame 13. The first floor plate 20, the second floor plate 21, the third floor plate 22 and the fourth floor plate 23 and the fifth floor plate 24 are not supported by any of the hoops 16. The floor plates are not shown in FIG. 5, 6, 10 to facilitate the view onto the frames and hoops.

Hoops 16 are provided. There are two hoops 16 between each frame 13, 15, 14. There are also two hoops 16 between the first vehicle mounting plate 11 and the second frame 14. There are also two hoops 16 between the second vehicle mounting plate 12 and the first frame 13.

A bellows 17 is provided (not shown in FIG. 5, 9, 10, 11 to allow for a better view onto the frames, but shown in FIG. 3) wherein the bellows 17 is attached to the first frame 13, the second frame 14, the further frame 15, the hoops 16 and the first vehicle mounting plate 11 and the second vehicle mounting plate 12.

The embodiment of FIG. 5, 6, 9, 10, 11 shows two support beams 18 to be present. The first vehicle mounting plate 11, the second vehicle mounting plate 12, the first frame 13, the second frame 14 and the further frame 15 are each supported by the support beams 18. The hoops 16 are arranged distanced from the support beams 18 and are not supported by the support beams 18. As can be best seen from FIG. 9 this is done by having the hoops 16 have large gaps in their bottom region that allow the beams 18 to pass freely through these gaps without making contact with the hoops 16.

Figure 7:
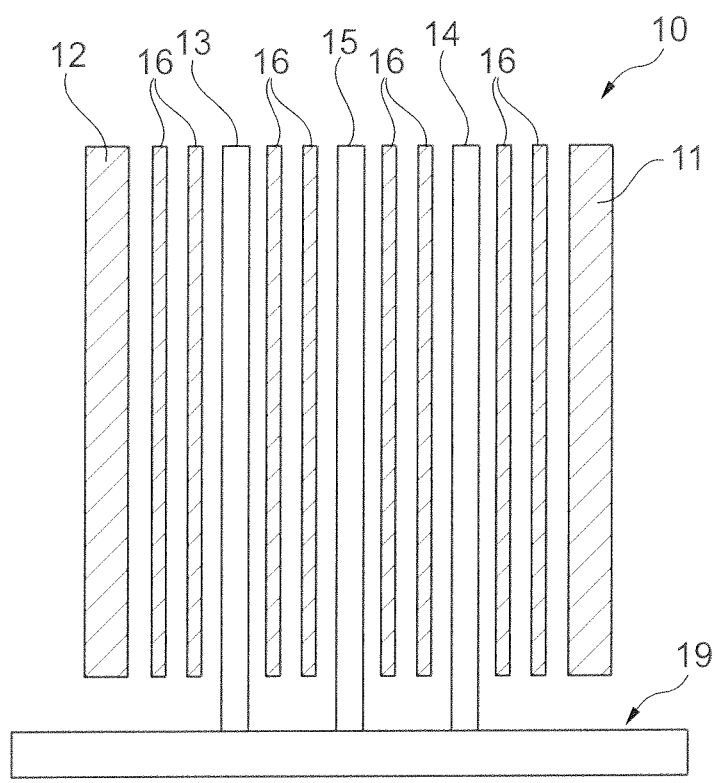
FIG. 7 a schematic side view onto a first embodiment of a gangway according to the invention.
Figure 8:
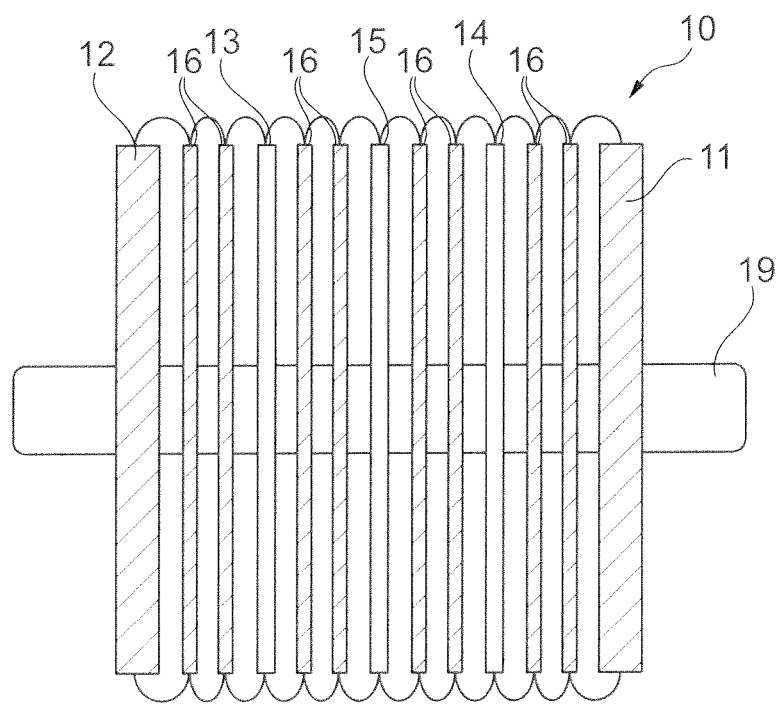
FIG. 8 a schematic top view onto the gangway according to FIG. 7.
Figure 13:
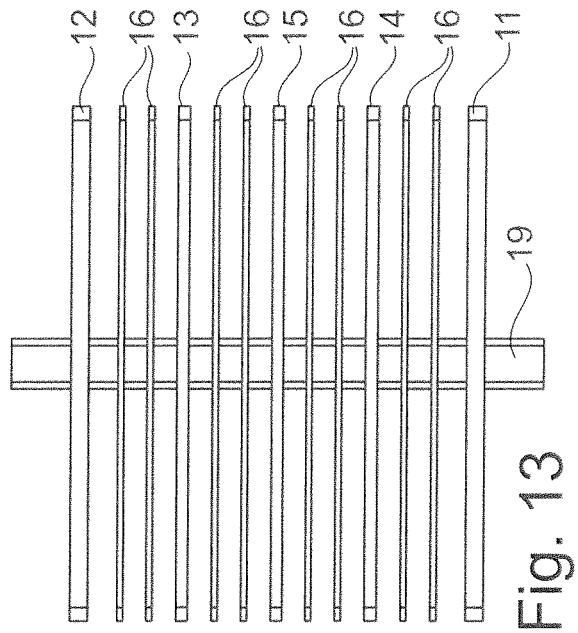
FIG. 13 a schematic top view onto the gangway according to FIG. 12.
Figure 14:
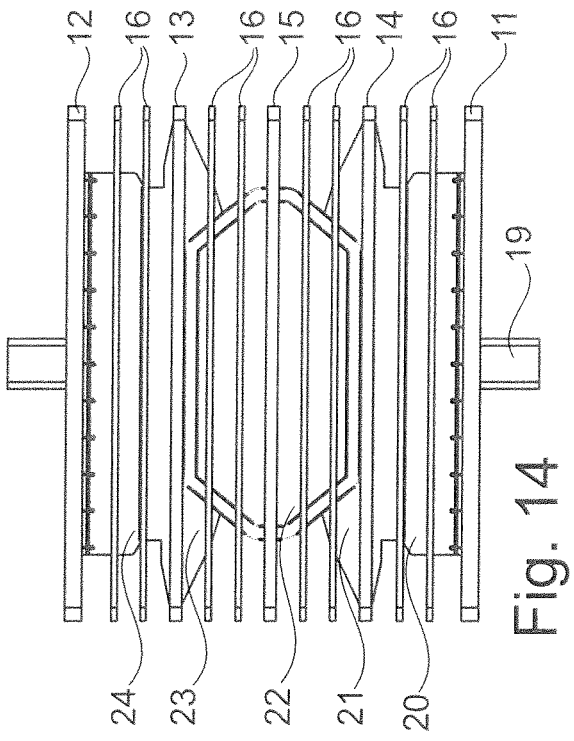
FIG. 14 a schematic top view onto the gangway according to FIG. 12.
Figure 12:
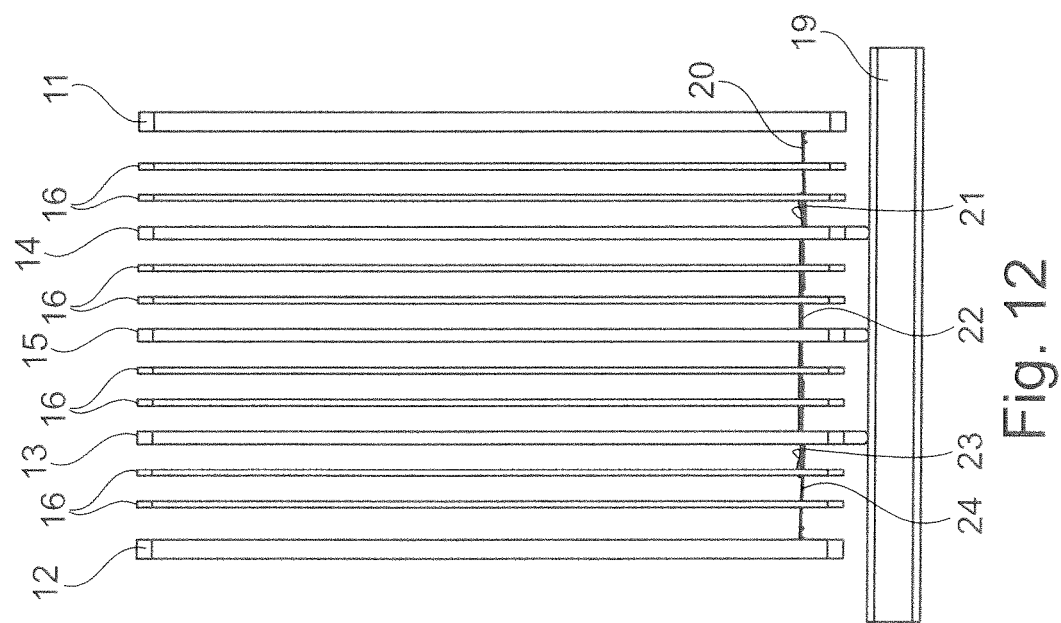
FIG. 12 a schematic side view onto a first embodiment of a gangway according to the invention.

The embodiment of FIG. 7, 8, 12, 13, 14 shows a coupler 19 to be present. The first vehicle mounting plate 11, the second vehicle mounting plate 12, the first frame 13, the second frame 14 and the further frame 15 are each supported by the coupler 19. The hoops 16 are arranged distanced from the coupler 19 and are not supported by the coupler 19. Otherwise, the arrangement of the embodiment shown in FIG. 7, 8, 12, 13, 14 is similar to the one shown in FIG. 5, 6, 9, 10, 11.

Figure 15:
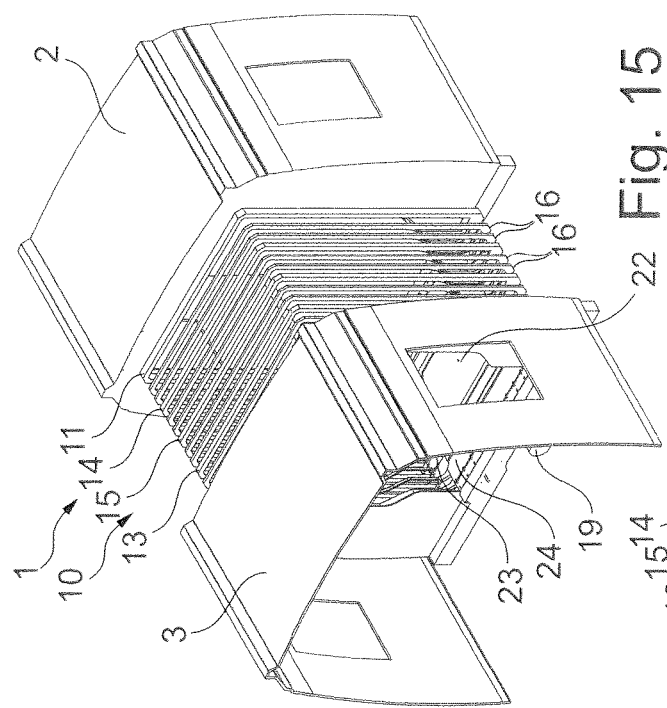
FIG. 15 shows a schematic perspective view of the part of the multi-car vehicle shown in FIG. 2.

FIG. 15 shows a schematic perspective view of the part of the multi-car vehicle shown in FIG. 2. The floors of the cars 2,3 are not shown to simplify the view. Also the convolutes of the bellows 17 of the gangway 10 are not shown to facilitate the view onto the first vehicle mounting plate 11, the second vehicle mounting plate 12, the first frame 13, the second frame 14, the further frame 15 and the hoops 16.

Figure 16:
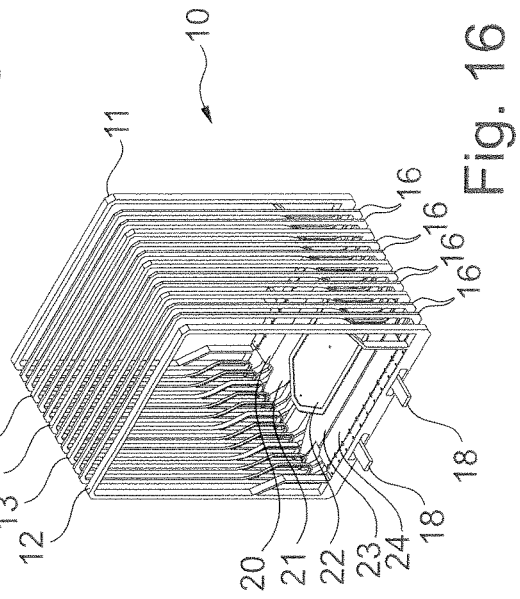
FIG. 16 shows a schematic perspective view of the gangway of the multi-car vehicle shown in FIG. 4.

FIG. 16 shows a schematic perspective view of the gangway of the multi-car vehicle shown in FIG. 4. The convolutes of the bellows 17 of the gangway 10 are not shown to facilitate the view onto the first vehicle mounting plate 11, the second vehicle mounting plate 12, the first frame 13, the second frame 14, the further frame 15 and the hoops 16.

Figure 17:
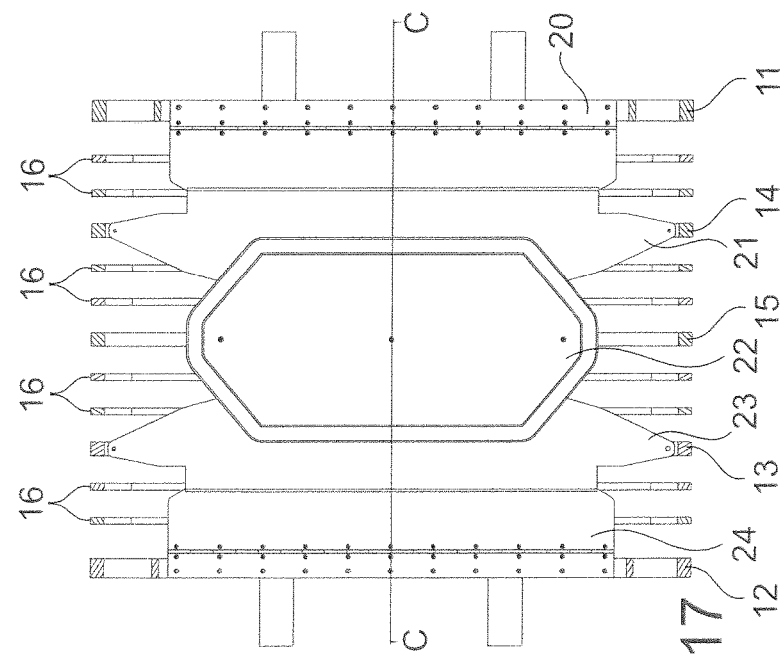
FIG. 17 shows a top view onto the floor of a gangway according to FIG. 16.
Figure 18:
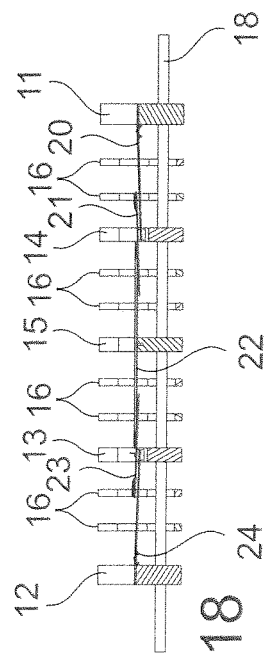
FIG. 18 shows a sectional side view onto the floor shown in FIG. 17.
Figure 19:
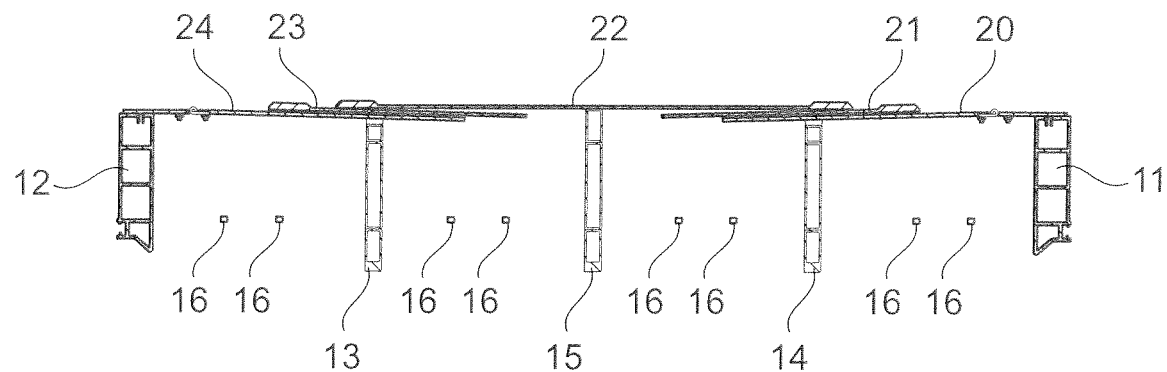
FIG. 19 shows an enlarged, more detailed view of view shown in FIG. 18.

FIG. 17 shows a top view onto the floor of a gangway according to FIG. 16. FIG. 18 shows a sectional side view onto the floor shown in FIG. 17. FIG. 19 shows a enlarged, more detailed view of view shown in FIG. 18. In the view of FIG. 19 the shapes of the elements only in this very cross-section are shown. While in FIG. 18 the view is chosen such that one sees the upward leading parts of the first vehicle mounting plate 11, the second vehicle mounting plate 12, the first frame 13, the second frame 14, the further frame 15 and the hoops 16, the view of FIG. 19 has purposefully been chosen to only show the very cross-section. This facilitates to understand that the hoops 16 pass under the first floor plate 20, the second floor plate 21, the third floor plate 22, the fourth floor plate 23 and the fifth floor plate 25 with substantial distance. The distance is so large that the hoops 16 also pass with substantial distance to the support beams 18 (not shown in FIG. 19).

Figure 20:
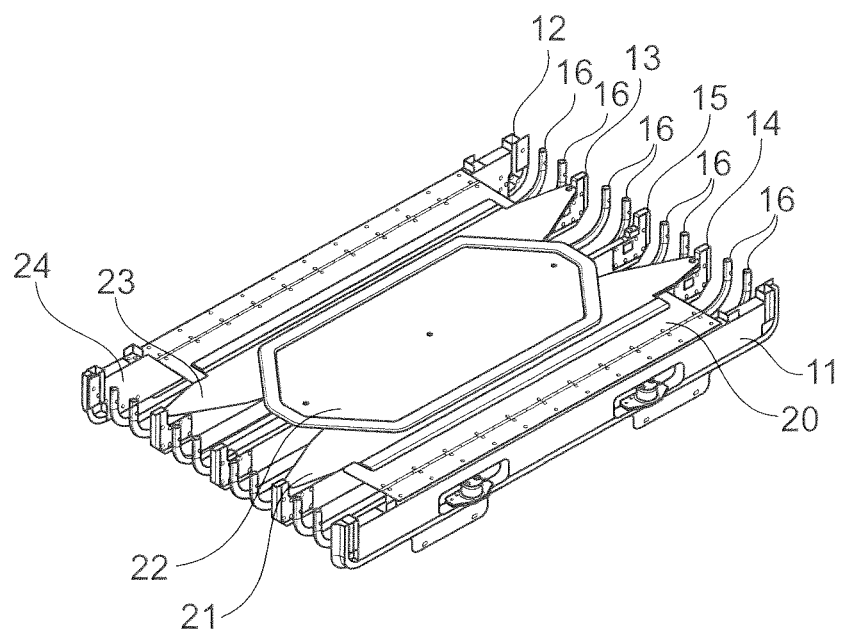
FIG. 20 shows a more detailed perspective view of the floor shown in FIG. 17

FIG. 20 shows a more detailed perspective view of the floor shown in FIG. 17

Figure 21:
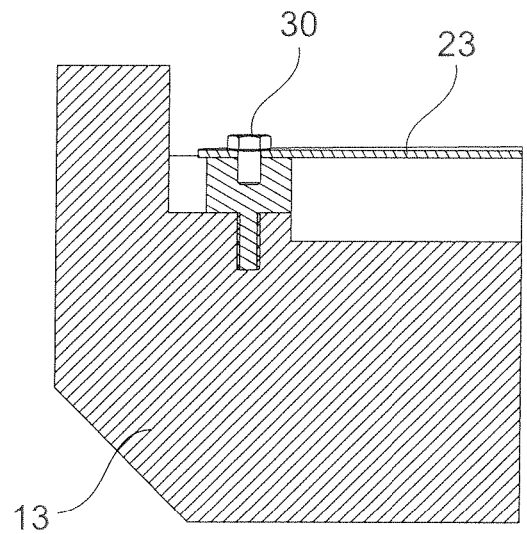
FIG. 21 shows a sectional schematic view of the attachment of the fourth floor plate to the first frame and FIG. 22 shows a sectional schematic view of the attachment of the third floor plate to the further frame.

FIG. 21 shows a sectional schematic view of the attachment of the fourth floor plate to the first frame. FIG. 21 shows that the fourth floor plate 23 is attached by way of a screw 30 to a buffer 31 that is bolted into the first frame 13.

Figure 22:
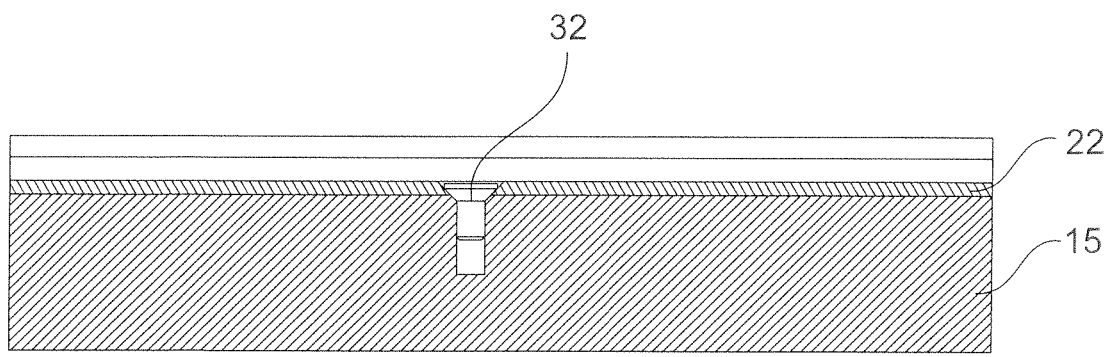

FIG. 22 shows a sectional schematic view of the attachment of the third floor plate to the further frame. FIG. 22 shows that the third floor plate 22 is attached by way of a screw 32 directly to further frame 15.

The invention claimed is:

1. A gangway for connecting a first car of a multi-car vehicle to a second car, the gangway having:
 a first vehicle mounting plate at a first end for mounting the gangway to the first car;
 a second vehicle mounting plate at a second end for mounting the gangway to the second car or to a frame arranged at the second end for mounting the gangway to a second gangway;
 a first frame arranged between the first vehicle mounting plate and the second vehicle mounting plate or arranged between the first vehicle mounting plate and the frame arranged at the second end for mounting the gangway to a second gangway;
 a second frame arranged between the first vehicle mounting plate and the first frame;
 wherein a bellows is attached to at least one of the first frame, the second frame, the first vehicle mounting plate and the second vehicle mounting plate or the frame arranged at the second end for mounting the gangway to a second gangway; and
 wherein at least one floor plate is supported by the first frame, the second frame, the first vehicle mounting plate, the second vehicle mounting plate or the frame arranged at the second end for mounting the gangway to a second gangway; and
 further comprising at least one hoop, wherein
 the bellows is attached to the at least one hoop;
 the at least one hoop does not support the floor plate; and
 the at least one hoop is arranged between the first vehicle mounting plate and the second frame or arranged between the second frame and the first frame or the first frame and the second vehicle mounting plate or arranged between the first frame and a frame arranged at the second end for mounting the gangway to a second gangway.

2. The gangway according to claim 1, wherein the at least one floor plate comprises a plurality of floor plates, each of said plurality of floor plates being supported by at least one of the first frame, the second frame, the first vehicle mounting plate and the second vehicle mounting plate or the frame arranged at the second end for mounting the gangway to a second gangway.

3. The gangway according to claim 2, wherein the plurality of floor plates comprises:
 a first floor plate supported by the first vehicle mounting plate;
 a second floor plate supported by the second frame;
 a third floor plate supported by the first frame; and
 a fourth floor plate supported by the second vehicle mounting plate or the frame arranged at the second end for mounting the gangway to a second gangway.

4. The gangway according to claim 1, wherein the at least one hoop comprises:
 a first hoop arranged between the first vehicle mounting plate and the second frame;
 a second hoop arranged between the first frame and the second frame; and
 a third hoop arranged between the first frame and the second vehicle mounting plate or the frame arranged at the second end for mounting the gangway to a second gangway.

5. The gangway according claim 1, wherein the at least one hoop comprises at least one of:
 a plurality of hoops arranged between the first vehicle mounting plate and the second frame; and/or
 a plurality of hoops arranged between the first frame and the second frame; and/or
 a plurality of hoops arranged between the first frame and the second vehicle mounting plate or the frame arranged at the second end for mounting the gangway to a second gangway.

6. The gangway according claim 1, further comprising a support beam, wherein at least the first frame and the second frame are supported on the support beam.

7. The gangway according claim 6, wherein the at least one hoop is not supported by the support beam.

8. A multi-car-vehicle comprising at least a first car and a second car, wherein the first car is coupled to the second car by a coupling, comprising a gangway having
 a. a first vehicle mounting plate at a first end for mounting the gangway to the first car;
 b. a second vehicle mounting plate at a second end for mounting the gangway to the second car or to a frame arranged at the second end for mounting the gangway to a second gangway;
 c. a first frame arranged between the first vehicle mounting plate and the second vehicle mounting plate or arranged between the first vehicle mounting plate and the frame arranged at the second end for mounting the gangway to a second gangway;
 d. a second frame arranged between the first vehicle mounting plate and the first frame;
 wherein a bellows is attached to at least one of the first frame, the second frame, the first vehicle mounting plate and the second vehicle mounting plate or the frame arranged at the second end for mounting the gangway to a second gangway; and
 wherein at least one floor plate is supported by the first frame, the second frame, the first vehicle mounting plate, the second vehicle mounting plate or the frame arranged at the second end for mounting the gangway to a second gangway;
 and further comprising at least one hoop, wherein
 the bellows is attached to the at least one hoop;
 the at least one hoop does not support the floor plate; and
 the at least one hoop is arranged between the first vehicle mounting plate and the second frame or arranged between the second frame and the first frame or the first frame and the second vehicle mounting plate or arranged between the first frame and the frame arranged at the second end for mounting the gangway to a second gangway;
 and wherein the gangway connects the first car with the second car and is configured to enable passage of passengers from the first car to the second car.

9. The multi-car-vehicle according to claim 8, wherein the first frame and the second frame are supported on the coupling.

10. The multi-car-vehicle according to claim 8, wherein the at least one hoop is not supported on the coupling.

* * * * *